March 18, 1941.  J. MERCIER  2,235,488

SHOCK-ABSORBING DEVICE

Filed Jan. 7, 1937

Jean Mercier
INVENTOR
By Otto Munk
his ATTY.

Patented Mar. 18, 1941

2,235,488

UNITED STATES PATENT OFFICE 2,235,488

SHOCK-ABSORBING DEVICE

Jean Mercier, Neuilly-sur-Seine, France

Application January 7, 1937, Serial No. 119,402
In Belgium December 22, 1936

8 Claims. (Cl. 188—88)

The present invention relates to a shock-absorbing device with differential operation, which is applicable chiefly to landing gear for aircraft and the like. The said device is of the type in which a deformable chamber communicates with an adjacent space, this communication being closed by an obturating member or valve when the oppositely-situated walls of the said chamber are given a relative movement, starting from their initial position, by an amount which is less than their maximum relative displacement. This communication is again opened during the return to the initial position and before passing through the position in which the closing took place.

The device in accordance with the invention is chiefly characterized by the fact the it comprises elastic means the tension of which is adjustable, acting against the differences of pressure prevailing in the two spaces and so arranged that the movements in both directions of the valve shaped member will take place with a certain spacing with reference to the variations of the differences of pressure above mentioned.

It will be observed that in this manner the valve-device, in its normal or idle position, will leave this communication open, and thus the operation of the shock absorber is quite responsive, but that under the action of an abrupt external force, it will close this communication when the deformable chamber has its volume reduced after a certain adjustable stroke, and hence after this time the operation of the shock-absorber becomes much less responsive.

When the external force causing the deformation of one of the said chambers, such as shock for instance, ceases or diminishes, the said slide-valve device returns automatically to its idle position, again opening the conduit connecting the two chambers and restoring the initial responsiveness to the shock-absorber.

The movement of the slide-valve device towards its closing position, which is due to the difference of pressure prevailing in the two chambers, takes place against the above-mentioned elastic or resilient means, which may consist of a spring, an air cushion, or both at the same time. When this difference of pressure diminishes, the slide-valve is automatically returned to its open or idle position by the effect of the said elastic means, which now restore the energy stored up. By a suitable choice of the initial tension of the said elastic means which must be overcome in order to allow the movement of the slide-valve (or the like) to its closing position, it is possible to obtain any desired delay in the operation of the slide-valve which takes place by the effect of the differences of pressure above mentioned. It is also feasible to provide, in the conduit connecting the two chambers, a safety-valve, known per se, which serves to connect these two separate chambers when the difference of pressure in the two chambers exceeds a predetermined limit.

On the other hand, use may be made of an additional check-valve which is mounted inside the slide-valve device or at any suitable point of the conduit connecting the two chambers, and serves to close the communication between the two chambers when fluid streams tend to flow in the contrary direction.

The accompanying drawing, which is given solely by way of example, shows various embodiments of the device in conformity with the invention.

Figure 1:
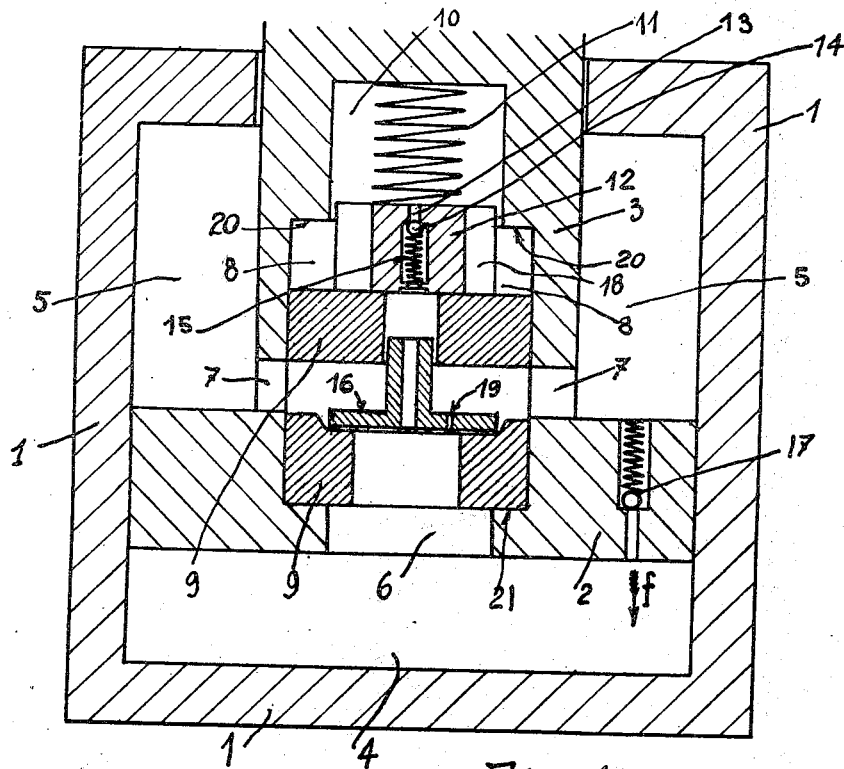
Fig. 1 is a section through a shock-absorber of the piston type, in accordance with the invention.

In the embodiment shown in Fig. 1, the apparatus comprises a recipient 1 in which is movable a piston 2 provided with a rod 3. The said piston separates the recipient 1 into a pressure chamber 4 and a chamber of variable capacity 5, which are normally connected together by connecting means of a preferably limited section, located inside one of these chambers, such as conduits or orifices 6—7 provided in the piston 2. In the said piston and in the rod is also provided a recess 8 in which is movable a device 9 having for instance the form of a slide-valve, which may occupy two positions, determined respectively by the stops 20 and 21. Fluid may freely flow from chamber 4 into space 5 while displacing valve 9 in the upward direction, whereas the flow in the opposite direction only takes place through orifice 19 which is very small. In the piston-rod 3, is provided another recess 10 connected with the recess 8 and adapted to contain a suitably calibrated spring 11. It is optionally possible to mount between the spring 11 and the valve 9 an intermediate movable member 12, pierced with a conduit having a controlling member such as a check-valve 14. Said valve 14 is urged by a suitably calibrated spring 15, and will only open in case the pressure prevailing in the space 10 exceeds the pressure in the space 8 below valve 9 or in the chamber 4 by a certain value. Thus, the space 10 acts upon valve member 9 as an air cushion means.

In the open position of the valve 9 a compensation of the pressures prevailing in the two spaces 4 and 10 is effected by the lifting of valve 12 relatively to valve 9 (thus uncovering grooves 18) during the descent stroke of piston 2. In fact when the piston 2 descends, the pressure in space 4 increases while the pressure in space 10 remains constant. At a certain moment valve 9 will be lifted under the action of the high pressure in 4 and will bear against shoulders or stops 20. In this position valve 9 closes the connection between spaces 4 and 5. If the pressure continues to increase in space 4, valve member 12 will be lifted under the action of this pressure against the action of spring 11. This possibility of communication between spaces 10 and 4 permits the fluid of passing into space 10 under a pressure which is practically equal to the one prevailing in space 4. It may be advantageous to mount in the circuit of communication between the two spaces 4 and 5, and more particularly in the slide-valve 9, as shown, a check-valve 16 adapted to substantially close, in the idle position of the said slide-valve, the connection between the chambers 4 and 5 (as shown), while always leaving open the connection between the chamber 4 and the recess 8, and thus the pressure prevailing in the chamber 4 may always be exercised upon the check-valve 14.

However, a small orifice 19 is preferably formed in the check-valve 16 in order that the chamber 4 may be again filled, when the expansion has taken place in the system, and also to prevent the chamber 4 from being emptied during a long operation of the shock-absorber.

On the other hand, the piston 2 may be provided in a known manner with a safety-valve 17 which will make connection between the chambers 4 and 5 when the pressure in the chamber 4 reaches a dangerous value.

The operation of the above described apparatus is as follows:

When the apparatus, which is shown in Fig. 1 in the idle position, is subject to an external stress due to a shock or the like, the recipient 1 being supposed to be stationary, the piston is lowered in the direction of the arrow *f*, and thus the pressure rises in the chamber 4 and falls in the chamber 5. This difference of pressure first raises the check-valve 16, thus making a free connection between the two chambers 4 and 5 through the conduits 6 and 7.

The damping is quite simple, and is due only to the loss of pressure in the conduits 7. When the difference of pressure between the two chambers 4 and 8 or 10 becomes greater than the resistance of the spring 11, the slide-valve 9 will be raised, thus compressing the spring 11 and closing the two conduits 7. From this time, which can be adjusted at will by a suitable choice of the initial tension of the spring 11, i. e. when in the position for opening the slide-valve 9, the damping becomes quite reliable, and the rigidity of the device due to the degree of closure of ports 7 by valve 9 will increase progressively according to the degree to which the piston 2 is driven into the recipient 1. During the upward stroke of piston 2 valve 9 is initially moved downwards establishing a connection between 6 and 7. During the downward stroke of piston 2, valve 16 will be lifted if the stroke is effected very quickly so that the pressure in chamber 4 increases suddenly and cannot be equalized through the small aperture 19, and the fluid pressure inside space 4 will maintain this valve 16 in its lifted position during the initial ascent of piston 2, until the pressures in 4 and 5 become equalized.

It is to be observed that this operation has exactly the qualities required in a shock-absorber for landing gear used upon aircraft, in which the damping must be very responsive when on the ground, while absorbing during the landing, the maximum energy without any abrupt recoil. This latter condition is also obtained, as the spring 11 cooperating with the pressure in 10 urges slide-valve 9 downwards and has a tendency to open the conduits 7, as soon as the pressure in the chamber 4 falls below a given value. Thus ports 7 are again opened and brought in communication with orifice 6. Any excess of pressure in chamber 4 which could produce a rebounding action in the shock-absorber is not to be feared, due to the communication 6—7 which causes the fluid to flow from chamber 4 to chamber 5. When the pressure falls in the chamber 4, the pressure in the recess 10, which has been raised to a considerable value during the upward stroke of the slide-valve 9, will cause, at a given time, the opening of the valve 14 against the action of its spring 15, thus again establishing the equilibrium of the pressures prevailing in 10 and 4.

In order to avoid that the pressure inside space 10 should be maintained at a maximum value corresponding to the maximum pressure prevailing in 4, the valve 14 is provided which permits the fluid of space 10 to flow into space 4 as soon as the pressure in 10 exceeds the pressure in 4. However, spring 15 always ensures a certain overpressure in space 10 which will ensure, at a later moment, a sudden descent of valve 9. In this way, if for instance after the lowering of piston 2 the pressures in spaces 4 and 10 become equal to about 200 kgs./cm.$^2$, and if during the following upward stroke of piston 2 the pressure in 4 decreases to 100 kgs./cm.$^2$ for instance, the pressure inside space 10 will be also lowered due to the opening of valve 14, but due to the pressure of the spring 15, exerting a contrary action, the pressure inside 10 will be somewhat higher than 100 kgs./cm.$^2$.

Figures 2, 3:
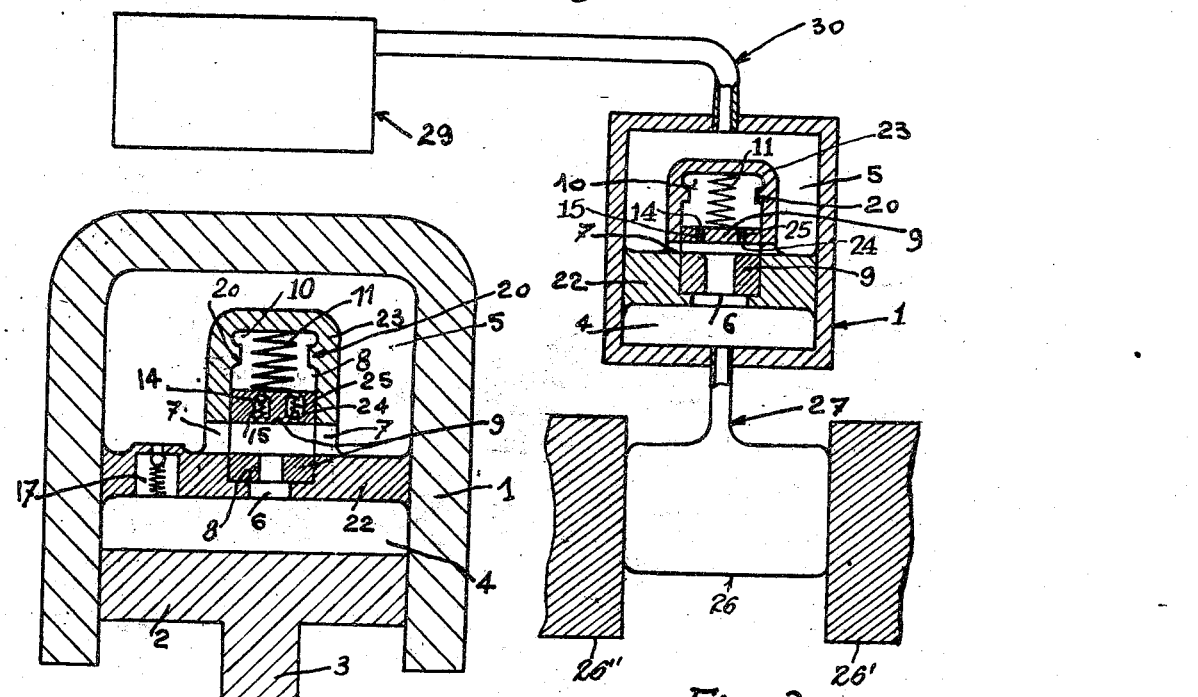
Fig. 2 is a like view of a modification.
Fig. 3 is a like view of a second modification.

It will be further noted that the check-valve 16 permits of preventing the flow of any fluid which might take place from the chamber 5 to the chamber 4. In fact, such a fluid current would produce a suction which might displace valve 16 in the direction of the current. Member 16 would be thus at once brought into the position represented, thus closing off the communication between chambers 5 and 4. It is evident that the check-valve 16 is not absolutely essential, and might be eliminated. In fact valve 16 is an auxiliary member which could be omitted as is shown in Figures 2 and 3. This member is simply provided in order to obtain a small increase of pressure in chamber 5 which will have a retarding action upon the return movement towards its lower position of container 1, the provision of such a member braking the equalizing of pressures in chambers 4 and 5. However, the principle of operation of the device is by no means affected by the presence or the absence of valve 16.

Fig. 2 shows a modification, in which the deformable chamber 4 is formed by the lateral walls of the recipient 1, by the front face of the piston 2, and by a partition 22 mounted in the said recipient. In the said partition, all the means are provided which have been shown in the preceding construction in the piston 2. Like parts are indicated by the corresponding reference figures.

The slide-valve 9 is movable in a cap 23 in which is formed the space 8, 10. However, instead of providing an intermediate member analogous to the member 12 of Fig. 1 located between the slide-valve 9 and the spring 11, there are mounted in the upper part of the slide-valve 9 two checks-valves 14—24 with respective reaction springs 15—25, in order to make connection between the spaces 4 and 10 when the pressure in one of these spaces exceeds the pressure in the other space by a value depending upon the force of one of the two springs 15—25.

The operation is similar to that of the device shown in Fig. 1. When the piston 2 moves upwards in the cylinder 1 under the action of an external force, the damping is first rather slight, due to the fact that the connection between the spaces 4 and 5 remains open through the conduits 6 and 7, which have rather large sections. The fluid flows therefore rather quickly from 4 to 5. When however during the upward movement of piston 2 the force acting upon the lower face of the slide-valve 9 becomes sufficient to overcome the resistance of the spring 12, the valve 9 will be raised, thus closing the conduits 7, so that the damping, from now on, will become much less responsive. During this movement, the check-valve 24 provides for a certain balancing of the pressures prevailing in the chambers 10 and 4.

When the piston descends, the pressure falls in the chamber 4, the check-valve 14 opens, and at a given time, the slide-valve 9 is lowered into the position represented, in which the two chambers 4 and 5 are again connected together. This connection through orifices of relatively large section permits of avoiding all rebounding action, due to the fact that the fluid in chamber 5 can quickly flow into chamber 4. The delay occurring in the operation of the slide-valve will depend, as in the preceding case, upon the force of the springs 11 and 15.

It should be noted that the apparatus above described is of particular value in the case of sudden stresses or shocks.

Fig. 3 shows a modified construction, which comprises a yielding chamber of any kind, which may consist of a balloon, a diaphragm, or the like.

In this case, the yielding chamber, which is shown diagrammatically at 26, is connected by coupling pipe means 27 to a casing 1 containing a device provided with check valves resembling the ones shown in Fig. 2. The auxiliary chamber is shown at 29, and it is connected by a coupling pipe means 30 to the part of the casing 1 corresponding to the chamber 5 of Fig. 1. This device can be used upon shock-absorbers having yielding balloons disposed between two movable parts 26' and 26". For instance the two movable parts may be disposed to both sides of chamber 26 as represented in Fig. 3.

The operation of the said shock-absorber is the same as in the preceding case. Chamber 26 may be deformed under the effect of the relative movement of the parts 26' and 26" disposed to both sides thereof. The compression of this chamber produces a corresponding compression in chamber 4 and after a determined period, the ascent of valve 9. From this moment on, the operation is identical to the one described with reference to Figs. 1 and 2. The fluid which is used in cases of Figs. 1 to 3 may consist of air, any suitable gas or like compressible fluid.

Obviously, the invention is not limited to the embodiments herein described, which are given solely by way of example.

Having now described my invention, what I claim as new and desire to secure by Letters Patent, is:

1. A shock-absorbing device of the type above referred to, comprising at least two chambers, one of these chambers being of variable capacity, direct connecting means of a preferably limited section between said chambers permitting the fluid to flow with a certain rather low speed from one chamber into the other, a movable valve member adapted to control said connecting means and subjected to the action of the pressure prevailing in said variable capacity chamber, air cushion means acting upon said valve member against said pressure, said valve member providing passageways therethrough between said variable capacity chamber and air cushion means, and auxiliary valve means at said passageways, loaded in both directions and allowing the fluid to flow therethrough in either direction under pressure differentials corresponding to their loads, thereby adapted to cause said valve member to be differently responsive to reverse modifications which occur in the said pressure.

2. A shock-absorbing device of the type above referred to, comprising at least two chambers, one of these chambers being of variable capacity, direct connecting means of a preferably limited section between said chambers permitting the fluid to flow with a certain rather low speed from one chamber into the other, a slide valve member adapted to control said connecting means and subjected to the action of the pressure prevailing in said variable capacity chamber, resilient reaction means acting upon said slide valve member against said pressure and including spring and air cushion means, said valve member providing a passage therethrough between said variable capacity chamber and air cushion means and a valve seat at said passage opposite said air cushion means, a second valve member between said spring means and valve seat and adapted to be lifted from said seat by a pressure differential to allow fluid to flow from said variable capacity chamber into said air cushion means, said second valve means also providing a passage therethrough between said variable capacity chamber and air cushion means, and a spring loaded valve in the last named passage, adapted to be opened by a reverse pressure differential to allow fluid to flow back from said air cushion means into said variable capacity chamber, said cooperating passages and loaded valves thereby being adapted to cause said slide valve member to be differentially responsive to reverse modifications which occur in the said pressure.

3. A shock-absorbing device of the type above referred to, comprising a housing, a piston movable therein, a piston rod, a recess in said piston and piston rod, conduits connecting together the two spaces on both sides of said piston, a slide valve member inside said recess adapted to close and open said conduits, resilient reaction means in said recess acting upon said valve member, an intermediary piece between said reaction means and valve member, channel means in said intermediary member, a controlling member, such as a check valve in said channel means and resilient means acting upon said controlling member.

4. A shock-absorbing device as claimed in claim 2, further comprising a floating controlling member in said connecting means, preferably located inside said movable valve member, and adapted when in a lower position of rest substantially to close the communication between said chambers, thus to avoid the direct flow of fluid towards said variable capacity chamber.

5. A shock-absorbing device of the type above referred to, comprising at least two chambers, one of these chambers being of variable capacity, direct connecting means of a preferably limited section between said chambers permitting the fluid to flow at a certain rather low speed from one chamber into the other, a movable valve member adapted to control said connecting means and subjected to the action of the pressure prevailing in said variable capacity chamber, air cushion means acting upon said valve member against said pressure, said valve member providing two passages therethrough between said variable capacity chamber and air cushion means, and two reversely arranged loaded valves each cooperating with the respective passage and allowing the fluid to flow in either direction through the respective passages under pressure differentials corresponding to their loads, thereby adapted to cause said valve member to be differentially responsive to reverse modifications which occur in the said pressure.

6. A shock-absorber of the type described, comprising a generally closed chamber of a fixed capacity, a variable capacity chamber adjacent a wall of said fixed capacity chamber, said wall having a port therethrough for connecting both said chambers, a movable valve member adapted to control said port and subjected to the pressure in said variable capacity chamber a housing within said fixed capacity chamber, surrounding said valve member and providing an air cushion acting on said valve member against said pressure, said valve member providing passageways therethrough between said variable capacity chamber and air cushion, and auxiliary valve means at said passageways, loaded in both directions and allowing the fluid to flow therethrough in either direction under pressure differentials corresponding to their loads, thereby adapted to cause said valve member to be differentially responsive to reverse changes of pressure in said variable capacity chamber.

7. A shock-absorber of the type described, comprising a piston, a cylinder ending opposite said piston, in a generally closed chamber of a fixed capacity and providing a chamber of variable capacity between the piston and the wall of said fixed capacity chamber opposite said piston, said wall having a port therethrough for connecting both said chambers, a movable valve member adapted to control said port and subjected to the pressure in said variable capacity chamber, a housing within said fixed capacity chamber, surrounding said valve member and providing an air cushion acting on said valve member against said pressure, said valve member providing passageways therethrough between said variable capacity chamber and air cushion, and auxiliary valve means at said passageways, loaded in both directions and allowing the fluid to flow therethrough in either direction under pressure differentials corresponding to their loads, thereby adapted to cause said valve member to be differentially responsive to reverse changes of pressure in said variable capacity chamber.

8. A shock-absorber according to claim 6, wherein the variable capacity chamber is formed of a collapsible container.

JEAN MERCIER.